United States Patent
Draaijer et al.

(10) Patent No.: US 10,447,497 B2
(45) Date of Patent: Oct. 15, 2019

(54) LIGHTING NETWORK (71) Applicant: SIGNIFY HOLDING B.V., Eindhoven (NL)

(72) Inventors: Maurice Herman Johan Draaijer, Ittervoort (NL); Theodorus Jacobus Johannes Denteneer, Eindhoven (NL); Hongming Yang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/559,267

(22) PCT Filed: Mar. 15, 2016

(86) PCT No.: PCT/EP2016/055492
§ 371 (c)(1),
(2) Date: Sep. 18, 2017

(87) PCT Pub. No.: WO2016/146603
PCT Pub. Date: Sep. 22, 2016

(65) Prior Publication Data
US 2018/0083799 A1 Mar. 22, 2018

(30) Foreign Application Priority Data
Mar. 17, 2015 (EP) .................. 15159368

(51) Int. Cl.
*H04L 12/46* (2006.01)
*H04W 84/18* (2009.01)
(Continued)

(52) U.S. Cl.
CPC ......... *H04L 12/4625* (2013.01); *H04W 12/04* (2013.01); *H04W 84/18* (2013.01);
(Continued)

(58) Field of Classification Search
CPC .. H04B 37/0272; H04W 84/18; H04W 88/06; H04W 12/04; H05B 37/0245; H05B 37/0272; H04L 12/4625
See application file for complete search history.

(56) References Cited

U.S. PATENT DOCUMENTS

2005/0025072 A1* 2/2005 Okada ................ H04L 45/00
370/256
2014/0022939 A1 1/2014 Apte et al.
2015/0057013 A1* 2/2015 Goldin ............ H05B 37/0227
455/456.1

FOREIGN PATENT DOCUMENTS

CN 202043336 U 11/2011
CN 103781259 A 5/2014
(Continued)

OTHER PUBLICATIONS

Alex Chapman, Hacking into Internet Connected Light Bulbs, pp. 1-7, Jul. 4, 2014 (Year: 2014).*
(Continued)

Primary Examiner — Anez C Ebrahim
(74) Attorney, Agent, or Firm — Meenakshy Chakravorty (57) ABSTRACT

A lighting device comprising: a first radio transceiver for connection to at least one further lighting device via a first wireless network; a second radio transceiver for connection to a network device via a second wireless network; a memory storing credentials assigned for use by the second transceiver for communication with the network device; and a control module configured to: detect that the lighting device is to operate as a bridge, instead of a further lighting device, to allow data to be exchanged between the at least one further lighting device and the network device; obtain credentials that have been established for use by the further lighting device to communicate with the second network; and modify the credentials stored in memory such that the
(Continued)

credentials associated with the further lighting device are assigned for use by the second transceiver, thereby configuring the lighting device to operate as the bridge.

14 Claims, 6 Drawing Sheets

(51) Int. Cl.
    *H04W 88/06*     (2009.01)
    *H05B 37/02*     (2006.01)
    *H04W 12/04*     (2009.01)
    *H04L 29/12*     (2006.01)
    *H04W 84/20*     (2009.01)

(52) U.S. Cl.
    CPC ........ *H04W 88/06* (2013.01); *H05B 37/0245* (2013.01); *H05B 37/0272* (2013.01); *H04L 61/6022* (2013.01); *H04W 84/20* (2013.01)

(56) References Cited

FOREIGN PATENT DOCUMENTS

| | | |
|---|---|---|
| JP | 2013046176 A | 3/2013 |
| WO | 2014014997 A2 | 1/2014 |

OTHER PUBLICATIONS

LIFX Network, strinking! pictures pp. 1-2, Jan. 30, 2014 (Year: 2014).*
"LIFX Network," LIFX Network—Striking Pictures, Jan. 30, 2014, http://blog.striking.Ch/archives/129-lifx-network.html (2 Pages).
Alex Chapman, "Hacking Into Internet Connected Light Bulbs," http://www.contextis.com/Resources/Blog/Hacking-Internet-Connected-Light-Bulbs/ Jul. 4, 2014 (7 Pages).

* cited by examiner

| Lighting Device | Wi-fi MAC |
|---|---|
| LD1 | MAC-A |
| LD2 | MAC-B |
| LD3 | MAC-C |
| LD4 | MAC-D |
| LD5 | MAC-E |

FIG. 5a

| Lighting Device | Wi-fi MAC |
|---|---|
| LD1 | MAC-A |
| LD2 | MAC-C |
| LD3 | MAC-B |
| LD4 | MAC-D |
| LD5 | MAC-E |

FIG. 5b

| Lighting Device | Wi-fi MAC |
|---|---|
| LD1 | MAC-B |
| LD2 | MAC-C |
| LD3 | MAC-D |
| LD4 | MAC-E |
| LD5 | MAC-A |

FIG. 5c

| Lighting Device | Wi-fi MAC |
|---|---|
| LD1 | MAC-C |
| LD2 | MAC-C |
| LD3 | MAC-C |
| LD4 | MAC-C |
| LD5 | MAC-C |

FIG. 5d

LIGHTING NETWORK

CROSS-REFERENCE TO PRIOR APPLICATIONS

This application is the U.S. National Phase application under 35 U.S.C. § 371 of International Application No. PCT/EP2016/055492, filed on Mar. 15, 2016, which claims the benefit of European Patent Application No. 15159368.8, filed on Mar. 17, 2015. These applications are hereby incorporated by reference herein.

TECHNICAL FIELD

The present disclosure relates to a lighting network. In particular to a lighting network comprising lighting devices that can be controlled by a control device.

BACKGROUND

Known lighting devices can be controlled using mechanical switches to turn the lighting devices on or off, or to dim up and down the amount of light emitted by the lighting device.

Connected lighting systems have been growing in popularity in recent times. A known connected lighting system comprises a plurality of lighting devices connected by a mesh network. Each of the plurality of lighting devices are identified by a unique fixed identifier known as a media access control (MAC) address that is based on the manufacturer of the lighting device and type of lighting device. Each of the plurality of lighting devices is able to function as a bridge between the mesh network and a Wi-Fi network. However only one of the plurality of lighting devices is permitted to operate as bridge between the mesh network and a Wi-Fi network at any one time. A control device such as a smartphone that is connected to the Wi-Fi network is operable to connect to the lighting device operating as the bridge in order to transmit control data to the plurality of lighting devices. A software application executed on the control device, enables a user of the control device to control the light emitted from the plurality of lighting devices e.g. turn one or more of the lighting devices on or off, dim up or down the amount of light emitted by one or more of the lighting devices, control the brightness of the light emitted by one or more of the lighting devices, and control the color of the light emitted by one or more of the lighting devices.

Figure 1:
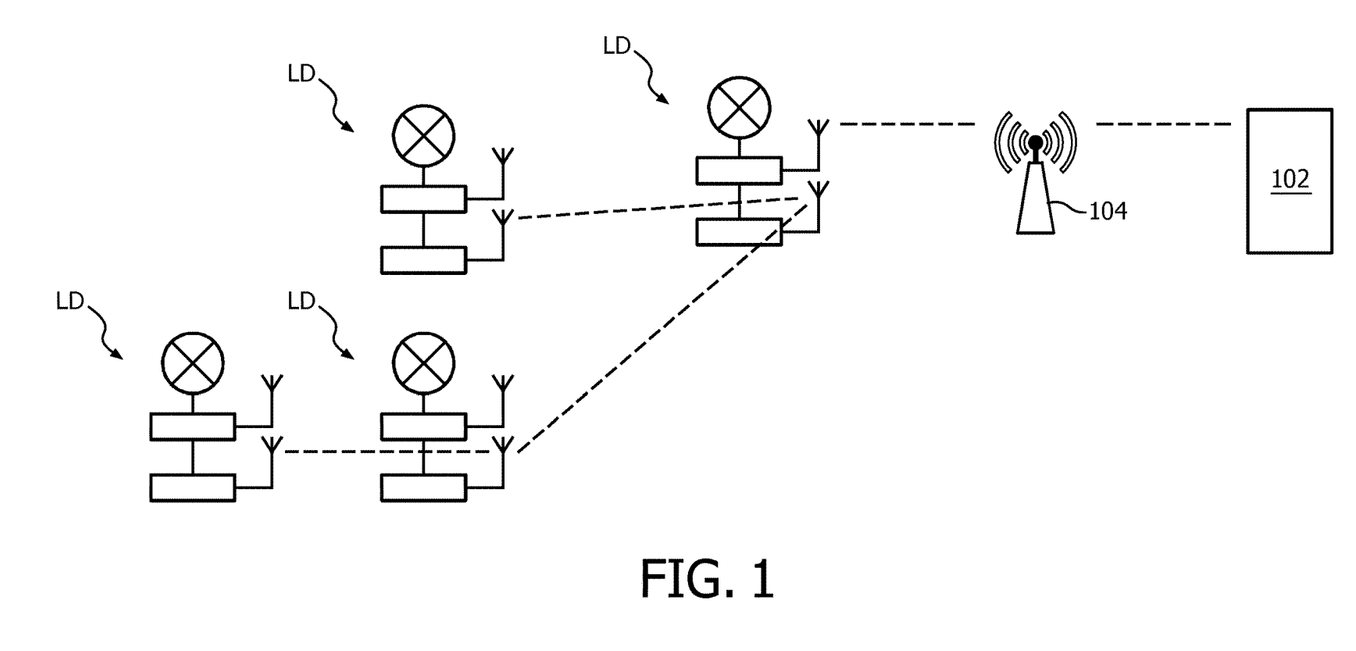
FIG. 1 illustrates a prior art lighting system comprising a plurality of lighting devices having a fixed MAC address.
Figure 2:
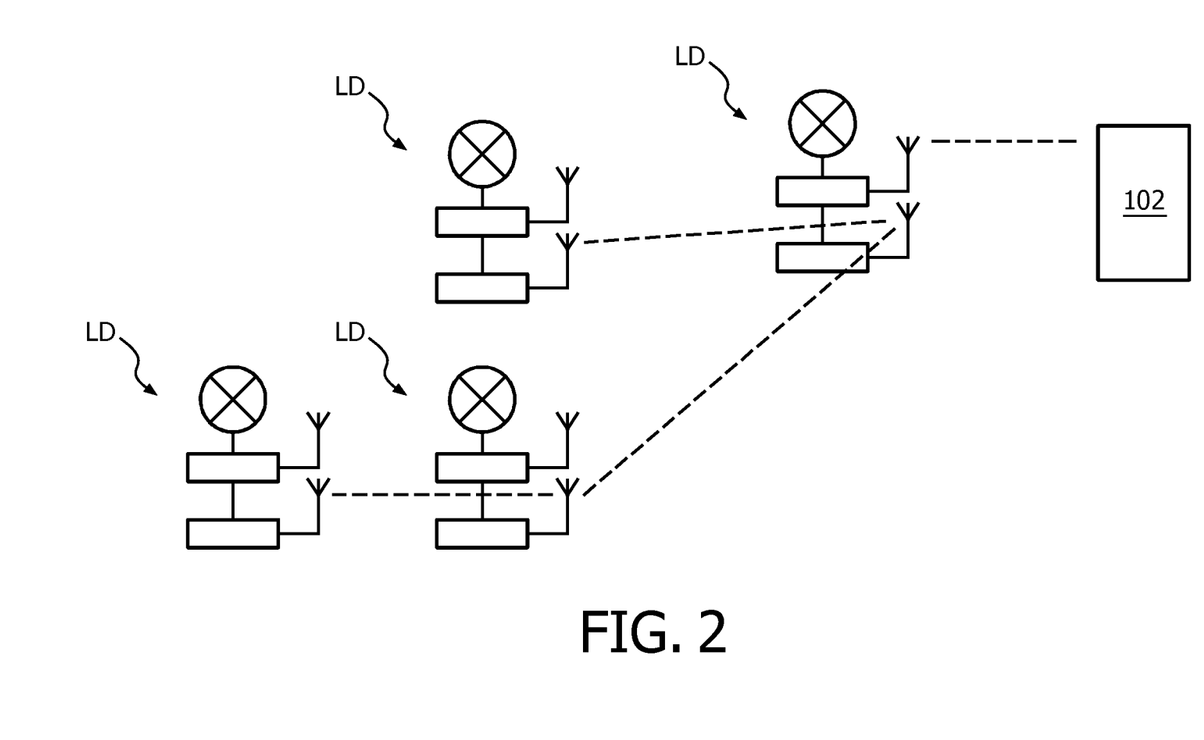
FIG. 2 illustrates a further prior art lighting system comprising a plurality of lighting devices having a fixed MAC address.

FIG. 1 illustrates a scenario whereby a control device 102 is connected to the lighting device operating as the bridge via an access point 104. Alternatively the control device 102 may connect to the lighting device operating as the bridge directly via the Wi-Fi network, this scenario is illustrated in FIG. 2.

SUMMARY

The inventors of the present disclosure have identified that in view of mobility, network stability and optimized network topology a dynamic network is required, which enables lighting devices to dynamically connect to an access point or control device.

According to one aspect of the present disclosure there is provided a lighting device comprising: a first radio transceiver for connection to at least one further lighting device via a first wireless network; a second radio transceiver for connection to a network device via a second wireless network; a memory storing network credentials, the stored network credentials comprising network credentials assigned for use by the second radio transceiver for communication with the network device via the second wireless network; and a control module configured to: detect that the lighting device is to operate as a bridge, instead of a further lighting device of said at least one further lighting device, to allow data to be exchanged between the at least one further lighting device and the network device; obtain network credentials associated with the further lighting device that have been established for use by the further lighting device to communicate with the second wireless network; and modify the network credentials stored in memory such that the network credentials associated with the further lighting device are assigned for use by the second radio transceiver for communication with the network device via the second wireless network, thereby configuring the lighting device to operate as the bridge.

The control module may be configured to detect that the lighting device is to operate as the bridge based on reception, via the first radio transceiver, of a message transmitted from the further lighting device via the wireless network, the message instructing the lighting device to operate as the bridge.

The control module may be configured to obtain the network credentials associated with the further lighting device based on reading said message.

The control module may be configured to: receive, via the first radio transceiver, signal properties and/or device capabilities associated with said at least one further lighting device transmitted from said at least one further lighting device via the first wireless network; determine signal properties and/or device capabilities associated with the lighting device; and detect that the lighting device is to operate as the bridge based on a comparison of the signal properties and/or device capabilities associated with the lighting device and the signal properties and/or device capabilities associated with the at least one further lighting device.

The stored network credentials may comprise network credentials associated with the further lighting device, and the control module is configured to obtain the network credentials associated with the further lighting device by querying said memory.

The control module may be configured to further modify the stored network credentials such that the further lighting device is associated with the network credentials assigned for use by the second radio transceiver for communication with the network device via the second wireless network prior to operating as the bridge.

The stored network credentials may comprise network credentials associated with each of the at least one further lighting device for communication via the second wireless network, and the control module may be configured to further modify the stored network credentials in accordance with a round-robin scheme.

The control module may be configured to exchange scheduling information via the first wireless network with the at least one further lighting device to synchronize said modification of the stored network credentials with the modification of network credentials stored on the at least one further lighting device.

The control module may be further configured to: detect that one of the at least one further lighting device is to operate as the bridge, instead of the further lighting device to allow data to be exchanged between the at least one further lighting device and the network device; obtain network credentials associated with the further lighting device that have been established for use by the further lighting device to communicate with the second wireless network; and modify the network credentials stored in memory such that the network credentials associated with the further lighting device are assigned for use by the second radio transceiver for communication with the network device via the second wireless network when the lighting device is to operate as the bridge.

The control module may be configured to detect that the lighting device is to operate as the bridge based on reception, via the first radio transceiver, of a command transmitted from a server connected to a remote network, via the further lighting device.

The control module may be configured to detect that the lighting device is to operate as the bridge based on reception, via the first radio transceiver, of a command transmitted from a control device connected to the second wireless network, via the further lighting device.

According to one aspect of the present disclosure there is provided a lighting system comprising: a first wireless network; and a plurality of lighting devices connected to the first wireless network; wherein each of the plurality of lighting devices comprise:

a first radio transceiver for connection to at least one further lighting device of the plurality of lighting devices via a first wireless network; a second radio transceiver for connection to a network device via a second wireless network; a memory storing network credentials, the stored network credentials comprising network credentials assigned for use by the second radio transceiver for communication with the network device via the second wireless network; and a control module configured to: detect that the lighting device is to operate as a bridge, instead of a further lighting device of said plurality of lighting devices, to allow data to be exchanged between the plurality of lighting devices and the network device; obtain network credentials associated with the further lighting device that have been established for use by the further lighting device to communicate with the second wireless network; and modify the network credentials stored in memory such that the network credentials associated with the further lighting device are assigned for use by the second radio transceiver for communication with the network device via the second wireless network, thereby configuring the lighting device to operate as the bridge.

According to one aspect of the present disclosure there is provided a method implemented by a lighting device comprising a first radio transceiver for connection to at least one further lighting device via a first wireless network; a second radio transceiver for connection to a network device via a second wireless network; and a memory storing network credentials, the stored network credentials comprising network credentials assigned for use by the second radio transceiver for communication with the network device via the second wireless network; the method comprising: detecting that the lighting device is to operate as a bridge, instead of a further lighting device of said at least one further lighting device, to allow data to be exchanged between the at least one further lighting device and the network device; obtaining network credentials associated with the further lighting device that have been established for use by the further lighting device to communicate with the second wireless network; and modifying the network credentials stored in memory such that the network credentials associated with the further lighting device are assigned for use by the second radio transceiver for communication with the network device via the second wireless network, thereby configuring the lighting device to operate as the bridge.

According to one aspect of the present disclosure there is provided a computer program product comprising code embodied on a computer-readable medium and being configured so as when executed on a processor of a lighting device comprising a first radio transceiver for connection to at least one further lighting device via a first wireless network; a second radio transceiver for connection to a network device via a second wireless network; and a memory storing network credentials, the stored network credentials comprising network credentials assigned for use by the second radio transceiver for communication with the network device via the second wireless network, to: detect that the lighting device is to operate as a bridge, instead of a further lighting device of said at least one further lighting device, to allow data to be exchanged between the at least one further lighting device and the network device; obtain network credentials associated with the further lighting device that have been established for use by the further lighting device to communicate with the second wireless network; and modify the network credentials stored in memory such that the network credentials associated with the further lighting device are assigned for use by the second radio transceiver for communication with the network device via the second wireless network, thereby configuring the lighting device to operate as the bridge.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 3A:
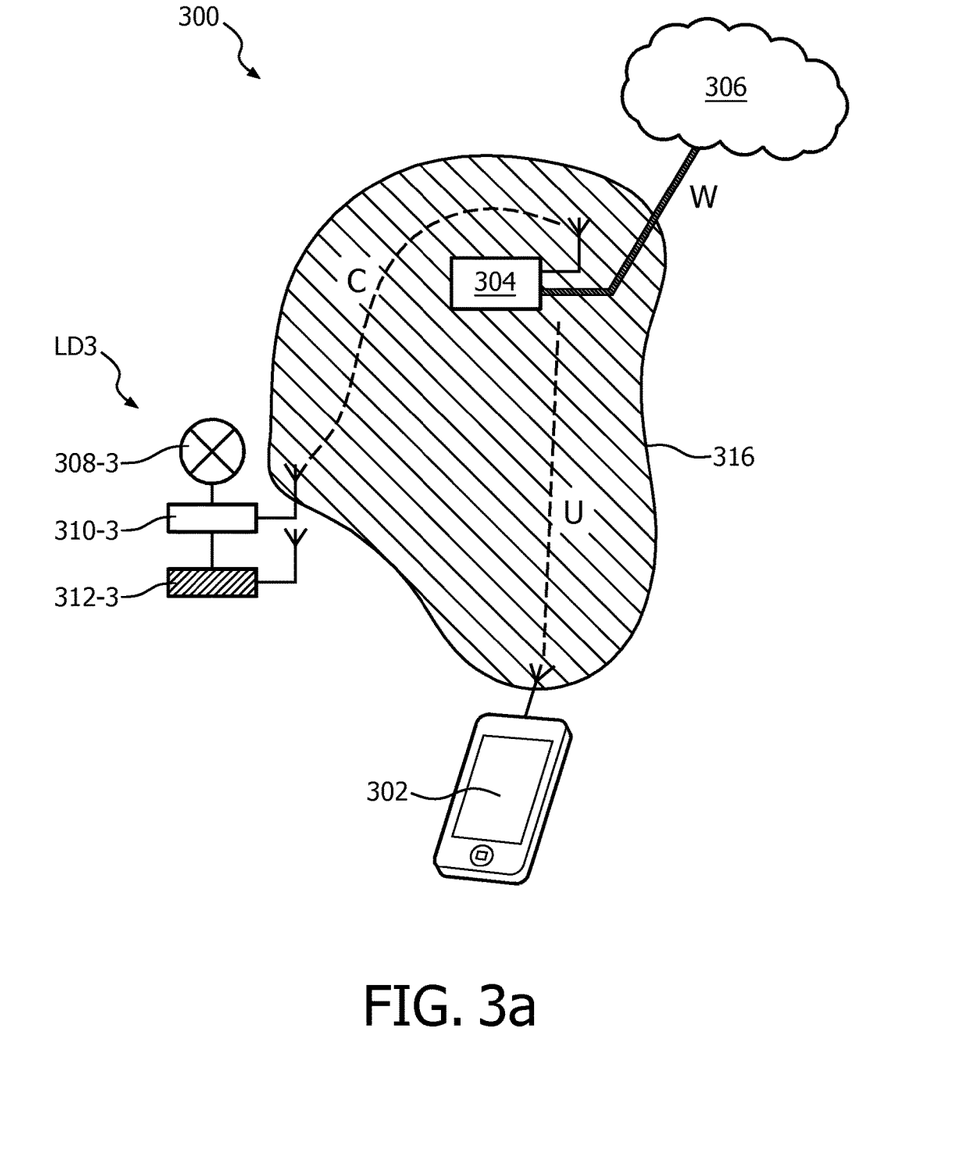
FIGS. 3a and 3b illustrate a lighting system in accordance with embodiments of the present disclosure.
Figure 3B:
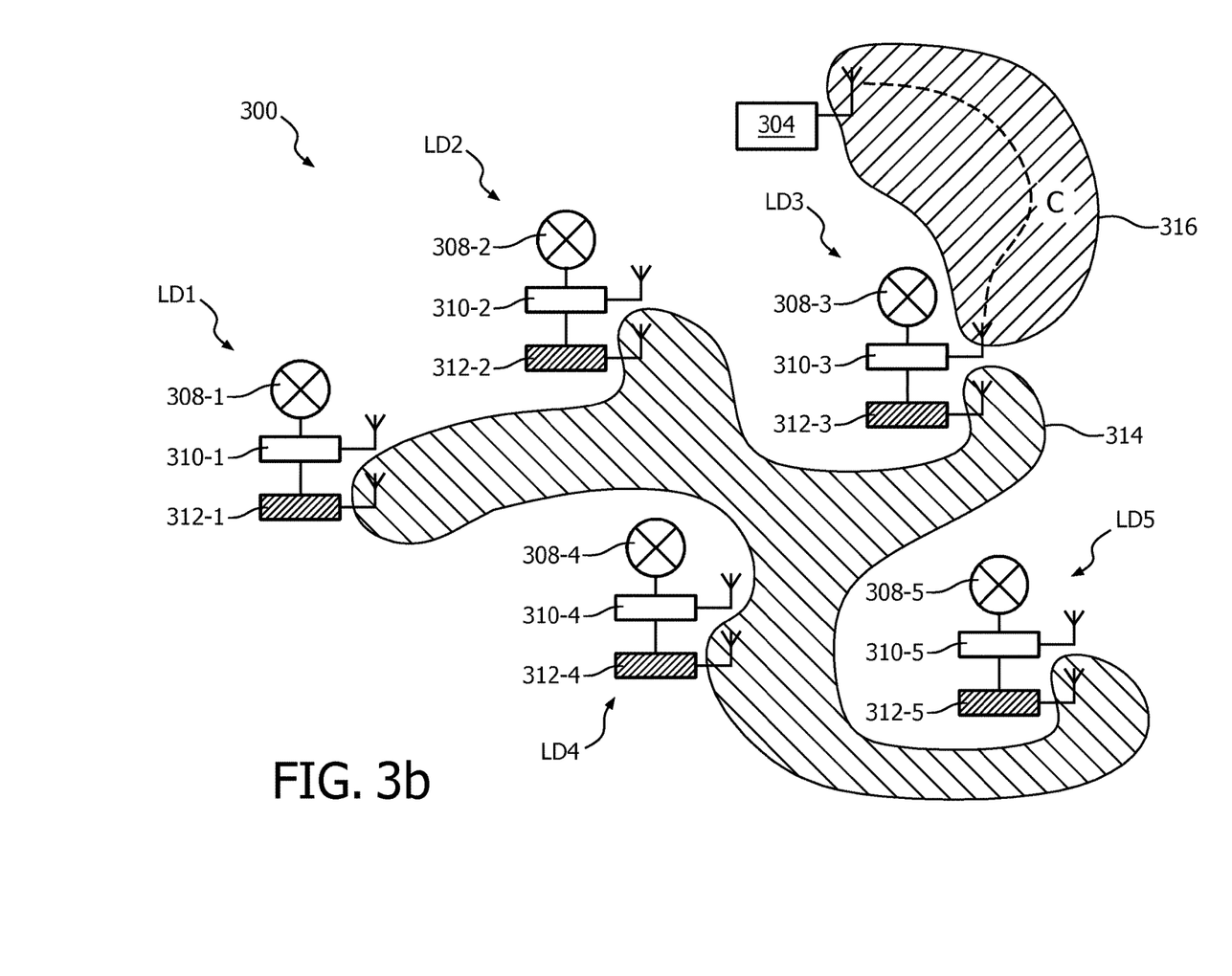

Reference is first made to FIGS. 3a and 3b which illustrate a lighting system 300.

The lighting system 300 comprises a plurality of lighting devices (LD). Each of the lighting devices LD comprise at least one light source 308, a Wi-Fi radio transceiver 310-$n$ (whereby n denotes the particular lighting device) for connection to a Wi-Fi network 316 to enable communication with other devices connected to the Wi-Fi network 316 in accordance with a Wi-Fi protocol (e.g. IEEE 802.11 legacy/a/b/g/n/ac/ad etc.), and a radio transceiver 312-$n$ for connection to a low-rate wireless personal area network (LR-WPAN) 314 such as a Zigbee or a IPv6 over Low power Wireless Personal Area Network (6lowpan) network to enable communication with other devices connected to the LR-WPAN 314 in accordance with a wireless networking protocol (e.g. IEEE 802.15.4).

Whilst FIG. 3b shows five lighting devices (LD1, LD2, LD3, LD4, and LD5) connected to the LR-WPAN 314, this is merely an example.

A Wi-Fi access point 304 is connected to the Internet 306 (or other packet based network) by means of connection (W) (FIG. 3a). As shown in FIGS. 3a and 3b, the Wi-Fi radio transceiver (310-3) of lighting device LD3 is connected to the Wi-Fi access point 304 by means of a connection (C) in the Wi-Fi network 316.

Each of the lighting devices can communicate with each other over the LR-WPAN 314 using their respective radio transceiver 312-n. Depending on the network topology of the LR-WPAN 314, a lighting device is able to communicate with each of the other lighting devices either via a direct communication link or indirectly via one or more other lighting devices. The network topology of the LR-WPAN 314 may be a star network, ring network, mesh network (fully connected or partially connected), tree network, bus network, or any other arrangement known to persons skilled in the art.

A control device 302 may connect to the Wi-Fi access point 304 by means of a connection (U) in the Wi-Fi network 316, this is illustrated in FIG. 3a. This allows data to be exchanged between the control device 302 and the lighting device LD3 via connections (U) and (C) in the Wi-Fi network 316. Alternatively, the control device 302 may connect to the lighting device LD3 via a direct connection in the Wi-Fi network 316 (i.e. not via Wi-Fi access point 304).

The control device 302 may be, for example, a mobile phone, a personal digital assistant (PDA), a tablet, a laptop computer, a gaming device or other device able to connect to the Wi-Fi network 316. The control device 302 is arranged to receive information from and output information to a user of the control device 302.

In the lighting system 300, the lighting device LD3 is operating as a "bridge". The term "bridge" is used herein to refer to a lighting device that allows data to be exchanged between the lighting devices connected to the LR-WPAN 314 and the control device 302 (data may be exchanged between the control device 302 and the bridge lighting device over the Wi-Fi network 316 directly or via the Wi-Fi access point 304). That is, data transmitted from the control device 302 is received by the lighting device LD3 using the Wi-Fi radio transceiver 310-3, and transmitted to the other lighting devices (LD1, LD2, LD4, and LD5) via the LR-WPAN 314 using the radio transceiver 312-3. This allows a user of the control device 302 to control the light emitted from one or more of the plurality of lighting devices e.g. turn one or more of the lighting devices on or off, dim up or down the amount of light emitted by one or more of the lighting devices, control the brightness of the light emitted by one or more of the lighting devices, and control the color of the light emitted by one or more of the lighting devices.

Each of the lighting devices (LD1, LD2, LD3, LD4, and LD5) has the capability to set up an association with the Wi-Fi access point 304 and act as a bridge.

During initial setup, one of the lighting devices is powered on. At this point, this lighting device does not possess security information necessary to authenticate and therefore connect to the Wi-Fi access point 304. The lighting device is configured to host its own Wi-Fi network (it acts as an access point) which enables the control device 302 to connect to the lighting device. A user of the control device 302 is able to configure this lighting device as the bridge by a configuration procedure in which security information is input into the control device 302 by the user of the control device 302 and transferred to the lighting device from the control device 302 (over the Wi-Fi network setup by the lighting device). After receipt of this security information, the lighting device is configured to shut down its hosted W-Fi network and connect to the Wi-Fi access point 304 using the received security information (i.e. the lighting device authenticates with the Wi-Fi access point 304). The security information may comprise for example a Service Set Identifier (SSID) and passphrase associated with the Wi-Fi access point 304.

When further lighting devices are powered on these further light devices may obtain the security information in the same manner described above for the bridge lighting device. Alternatively, these further lighting devices may obtain the security information by communicating securely with the bridge lighting device (enabled by a shared secret configured at the time of manufacture) to setup the LR-WPAN 314, and receive the security information via the LR-WPAN 314. Communications over the LR-WPAN 314 between the lighting devices LR-WPAN 314 may be secured using a fixed or dynamic encryption key.

The lighting device LD3 may be operating as the bridge for one of various reasons. For example, lighting device LD3 may have been turned on before any of the other lighting devices (LD1, LD2, LD4, and LD5) were turned on, or during initial installation of the lighting devices (LD1, LD2, LD3, LD4, and LD5) the lighting device LD3 may have had the best link budget and since this time the bridge function has not changed/updated.

The network of lighting devices (LD1, LD2, LD4, and LD5) can dynamically change, for example, a lighting device other than lighting device LD3 can become the bridge, This change in which lighting device is operating as the bridge can be caused by a change in the radio environment. For example, by changing the bridge functionality from lighting device LD3 to lighting device LD2, the network quality is improved resulting in a better performance of the lighting experience in terms of response/latency etc.

Each lighting device's Wi-Fi radio transceiver 310-n is associated with a MAC address. A MAC address of a Wi-Fi radio transceiver 310-n consists of 6 bytes of information which typically appear in a human readable format as six pairs of hexadecimal digits, separated by colons or dashes and serves as a unique identifier for the Wi-Fi radio transceiver 310-n of a networked device. The MAC address of a Wi-Fi radio transceiver 310-n enables communication with the control device 302 over the Wi-Fi network 316 directly or via the Wi-Fi access point 304.

Each lighting device's radio transceiver 312-n is also associated with a MAC address which is different to the MAC address of the Wi-Fi radio transceiver 310-n of the lighting device. The MAC address of a radio transceiver 312-n enables communication over the LR-WPAN 314 with the other lighting devices connected to the LR-WPAN 314.

The inventors of the present disclosure have identified that in known lighting systems whereby the MAC address of each of the lighting device's Wi-Fi radio transceiver 310-n is directly coupled to the hardware of the lighting device (i.e. each Wi-Fi radio transceiver 310-n has a fixed Wi-Fi MAC address), this change in the lighting device operating as the bridge referred to above can cause the lighting devices connected to the LR-WPAN 314 to become unresponsive to lighting commands transmitted by the control device 302.

For additional security the Wi-Fi access point 304 may be configured to perform "MAC filtering" to only allow connections from devices with certain MAC addresses. Thus in case of the change in bridge referred to above, the Wi-Fi MAC address of the Wi-Fi radio transceiver 310-2 of the lighting device LD2 may not be allowed to connect to the Wi-Fi access point 304 if the Wi-Fi MAC address of the Wi-Fi radio transceiver 310-2 of lighting device LD2 is not present in the MAC "whitelist" of the Wi-Fi access point 304 (list of MAC addresses permitted to connect to the Wi-Fi access point 304) even if the lighting device LD2 possesses the necessary security information (e.g. SSID/passphrase) to authenticate with the Wi-Fi access point 304.

Thus users of the known lighting system may incorrectly diagnose a healthy lighting device as faulty due to network errors or network connection quality.

In order to overcome this, reprogramming of the Wi-Fi access point 304 may be implemented in order for the lighting device LD2 to be authenticated to communicate with the Wi-Fi access point 304, however this requires manual user input each time the lighting device operating as the bridge changes. Even if the lighting device LD2 is already authenticated in advance (i.e. lighting device LD2 has received the security information necessary to authenticate with the Wi-Fi access point 304 and the Wi-Fi MAC address of the Wi-Fi radio transceiver 310-2 of lighting device LD2 has been added to the MAC "whitelist" of the Wi-Fi access point 304) it still requires additional time for the Wi-Fi access point 304 and the control device 302 to adapt themselves to the changes of the bridge, e.g. in terms of destination address for the packets transmitted to the lighting devices and the source address for the packets transmitted from the lighting devices.

In embodiments of the present disclosure, Wi-Fi MAC addresses are not directly coupled to the hardware of the lighting devices. Instead, when the bridge functionality changes for example from lighting device LD3 to the lighting device LD2, the Wi-Fi MAC address of the lighting device LD2 changes to the Wi-Fi MAC address used by the lighting device LD3 when the lighting device LD3 was operating as the bridge. Thus whilst physically the network topology of the LR-WPAN 314 and bridge location changes, from the viewpoint of the Wi-Fi access point 304 as well as the control device 302, nothing changes because it think it keeps communicating with the same lighting device. Embodiments of the present disclosure are particularly advantageous is that only one Wi-Fi MAC address is needed to be added to the MAC "whitelist" of the Wi-Fi access point 304, because this particular Wi-Fi MAC address will be always used by whichever lighting device takes up the role of the gateway.

Figure 4:
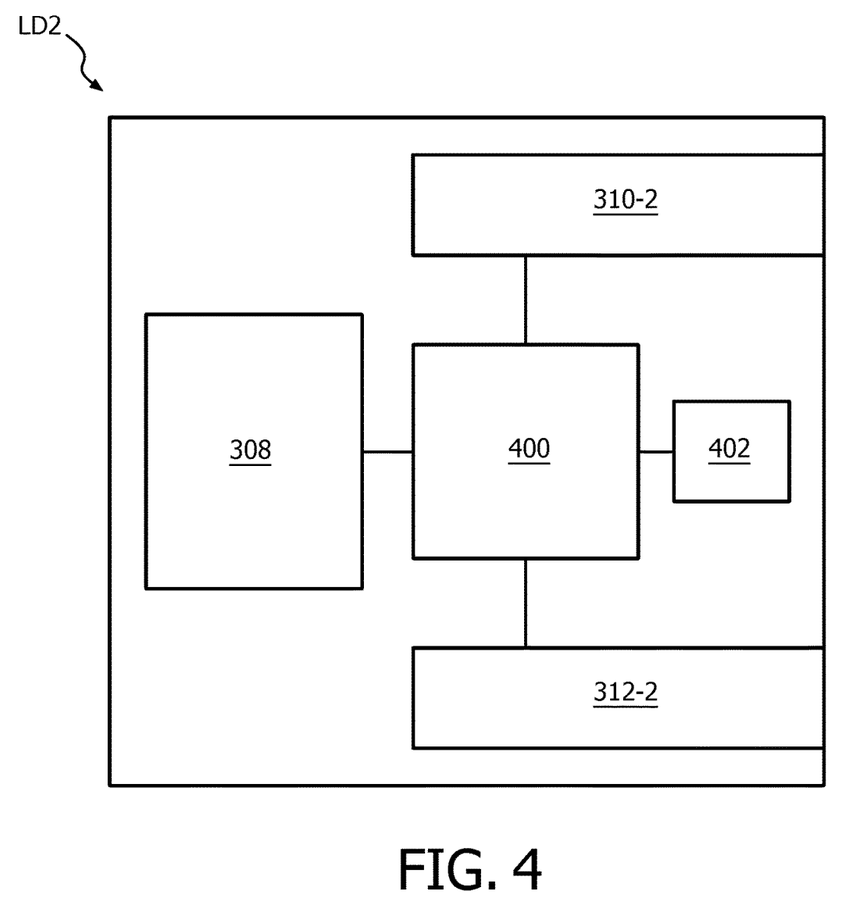
FIG. 4 illustrates a lighting device in accordance with embodiments of the present disclosure.

Reference is now made to FIG. 4 which illustrates a schematic block diagram of a lighting device LD2 of the lighting system 300 in accordance with embodiments of the present disclosure.

As shown in FIG. 4 the lighting device LD2 comprises at least one light source 308, a Wi-Fi radio transceiver 310-2 for connection to the Wi-Fi network 316, a radio transceiver 312-2 for connection to the LR-WPAN 314 such as a Zigbee or 6lowpan network, a control module 400 and a memory 402. The other lighting devices (LD1, LD3, LD4, and LD5) connected to the LR-WPAN 314 correspond to the lighting device LD2 shown in FIG. 4.

The control module 400 is configured to receive lighting commands that are received via either the Wi-Fi radio transceiver 310-2 or the radio transceiver 312-2 and control the light emitted from the lighting source(s) 308 by transmitting appropriate control signals to the lighting source(s) 308. When the lighting device LD2 is operating as the bridge, the lighting commands are received via the Wi-Fi radio transceiver 310-2 (the lighting commands having been received directly from the control device 302 or indirectly from the control device 302 via the Wi-Fi access point 304). When the lighting device LD2 is not operating as the bridge, the lighting commands are received via the radio transceiver 312-2 (the lighting commands having been received directly from the lighting device operating as the bridge or indirectly from the lighting device operating as the bridge via one or more other lighting devices in the LR-WPAN 314).

The functionality of the control module 400 may be implemented in code (software) stored on a memory comprising one or more storage media, and arranged for execution on a processor comprising on or more processing units. The code is configured so as when fetched from the memory and executed on the processor to perform operations in line with embodiments of the present disclosure discussed herein. Alternatively it is not excluded that some or all of the functionality of the control module 400 is implemented in dedicated hardware circuitry, or configurable hardware circuitry like a field-programmable gate array (FPGA).

The lighting source(s) 308 may comprise any suitable source of light that is capable of emitting light in the spectrum visible to humans such as e.g. a high/low pressure gas discharge source, a laser diode, an inorganic/organic light emitting diode (LED), an incandescent source, or a halogen source. A light source may be a single light source, or could comprise multiple light sources, e.g. multiple LEDs which may, for example, form an array of light sources collectively operating as a single light source.

The memory 402 stores at least (i); the Wi-Fi MAC address of the Wi-Fi radio transceiver 310-2 (ii) the MAC address of the radio transceiver 312-n of the lighting device that is currently operating as the bridge (if the lighting device LD2 is not currently operating as the bridge); and (iii) predetermined rules on how to modify the network credential information when it is detected that the role of bridge has changed to another lighting device in the LR-WPAN 314.

Embodiments are described below with reference to a scenario whereby the control module 400 on lighting device LD2 detects that the lighting device LD2 is to operate as the bridge instead of lighting device LD3.

The control module 400 on lighting device LD2 may detect that the lighting device LD2 is to operate as the bridge instead of lighting device LD3 by various mechanisms.

A bridge election algorithm is dynamically executed to determine which lighting device is to act as the bridge to optimize performance of the lighting system 300.

The bridge election algorithm may be a distributed arbitration algorithm executed on each of the lighting devices (LD1, LD2, LD3, LD4, and LD5) so that the lighting devices jointly elect which lighting device is most suitable to be the bridge. In this embodiment, in a periodical fashion, e.g. once every minute, all of the living lighting devices communicate with each other over the LR-WPAN 314 to share its own signal properties and/or device capabilities. The signal properties may include one or more of received signal strength, delay, transmitting power, number of hops to all lighting devices in the LR-WPAN 314, latency to all lighting devices in the LR-WPAN 314, bandwidth to all lighting devices in the LR-WPAN 314, signal-to-noise ratio to the Wi-Fi access point 304, etc. The device capabilities may include one or more of the processing capability of the device, amount of memory available on the device, etc.

Thus the control module 400 on lighting device LD2 may receive via the LR-WPAN 314, signal properties and/or device capabilities associated with lighting devices (LD1, LD3, LD4, and LD5), determine signal properties and/or device capabilities associated with the lighting device LD2; and detect that the lighting device LD2 is to operate as the bridge based on a comparison of its own signal properties and/or device capabilities with the signal properties and/or device capabilities associated with the other lighting devices in the LR-WPAN 314.

After this election process, if a new lighting device is elected to be the new bridge, every other lighting device in the LR-WPAN 314 is then naturally aware of this decision.

Alternatively the bridge election algorithm may be a leader election algorithm executed on a single lighting device (e.g. the bridge lighting device). In this embodiment, the "leader" lighting device uses its own signal properties and/or device capabilities, and the signal properties and/or device capabilities of other lighting devices in the LR-WPAN 314 to determine which lighting device is most suitable to be the bridge. Once this determination is made, the "leader" lighting device communicates the determination to the lighting device that has been elected to be the new bridge (and may also communicate the determination to the other lighting devices connected to the LR-WPAN 314).

Thus, the control module 400 on lighting device LD2 may detect that the lighting device LD2 is to operate as the bridge based on receipt, via the radio transceiver 312-2, of a message from the "leader" lighting device instructing the lighting device LD2 to operate as the bridge. Other lighting devices can be informed of this election directly by the "leader" lighting device or by the lighting device LD2. Alternatively, the other lighting devices can be informed of this election directly by listening to traffic in the LR-WPAN 314.

Instead of the leader election algorithm being executed on one of the lighting devices (LD1, LD2, LD3, LD4, and LD5), it may be executed on an external server connected to the Internet 306. In this embodiment, each of the living lighting devices transmits its own signal properties and/or device capabilities to the external server. Based on a comparison of the signal properties and/or device capabilities of the lighting devices, the external server determines which lighting device is to operate as the bridge and transmits a command to the newly elected bridge lighting device (via the former lighting device). Thus the control module 400 on lighting device LD2 may detect that the lighting device LD2 is to operate as the bridge based on receiving such a command using the radio transceiver 312-2 (received via the former bridge lighting device).

Furthermore, the control module 400 may detect that the lighting device LD2 is to operate as the bridge based on receiving a command from the control device 302 using the radio transceiver 312-2 (received via the former bridge lighting device). This command is transmitted from the control device 302 in response to a user of the control device 302 making one or more selections interacting with a software application executed on the control device 302. The command from the control device 302 may override any decision made by execution of a bridge election algorithm described above.

Figure 5A:
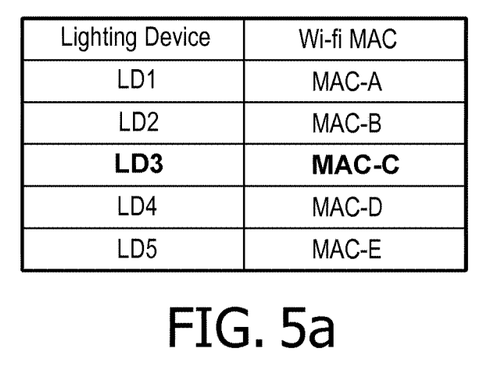
FIGS. 5a-d illustrates network credentials stored by the lighting devices in embodiments of the present disclosure.

FIG. 5a illustrates example network credential information indicating MAC addresses of the Wi-Fi radio transceiver's 310-1-310-5. In particular, FIG. 5a illustrates that the lighting device LD1 is associated with a Wi-Fi MAC address MAC-A, the lighting device LD2 is associated with a Wi-Fi MAC address MAC-B, the lighting device LD3 is associated with a Wi-Fi MAC address MAC-C, the lighting device LD4 is associated with a Wi-Fi MAC address MAC-D, the lighting device LD5 is associated with a Wi-Fi MAC address MAC-E. FIG. 5a illustrates, by way of the bold font that the lighting device LD3 is operating as the bridge.

The control module 400 on lighting device LD2 is able to detect that the lighting device operating as the bridge has changed due to a change in the radio environment, and modify the network credential information stored in the memory 402 accordingly.

In accordance with all embodiments of the present disclosure, upon detecting that the lighting device LD2 is to operate as the bridge instead of lighting device LD3, the control module 400 is configured to modify the network credential information stored in the memory 402 such that the lighting device LD2 is associated with the MAC address (MAC-C) used by the lighting device LD3 when the lighting device LD3 was operating as the bridge.

In the scenario whereby the control module 400 on lighting device LD2 detects that the lighting device LD2 is to operate as the bridge based on receipt, via the radio transceiver 312-2, of a message transmitted from the "leader" lighting device (e.g. lighting device LD3) over the LR-WPAN 314 instructing the lighting device LD2 to operate as the bridge, the control module 400 on lighting device LD2 may obtain the Wi-Fi MAC address (MAC-C) used by the lighting device LD3 when the lighting device LD3 was operating as the bridge by reading the received message (the message comprises the Wi-Fi MAC address MAC-C).

In embodiments, the memory 402 may additionally store at least the Wi-Fi MAC address (MAC-C) used by the lighting device LD3 that is currently operating as the bridge.

In the scenario whereby the control module 400 on lighting device LD2 detects that the lighting device LD2 is to operate as the bridge based on receipt, via the radio transceiver 312-2, of a message transmitted from the "leader" lighting device (e.g. lighting device LD3) over the LR-WPAN 314 instructing the lighting device LD2 to operate as the bridge, the control module 400 on lighting device LD2 may obtain the Wi-Fi MAC address (MAC-C) by querying the memory 402 (if for example the message does not comprise the Wi-Fi MAC address (MAC-C). Similarly, in the scenario whereby the control module 400 on lighting device LD2 detects that the lighting device LD2 is to operate as the bridge based on execution of a bridge election algorithm, the control module 400 on lighting device LD2 may obtain the Wi-Fi MAC address (MAC-C) by querying the memory 402.

In a first embodiment, the predetermined rules on how to modify the network credential information stored in memory 402 specify that only the Wi-Fi MAC addresses of the former lighting device acting as the bridge and the new lighting device acting as the bridge are to be modified. In particular, that the Wi-Fi MAC address of the former bridge lighting device is to be swapped with the Wi-Fi MAC address of the new bridge lighting device.

Figure 5B:
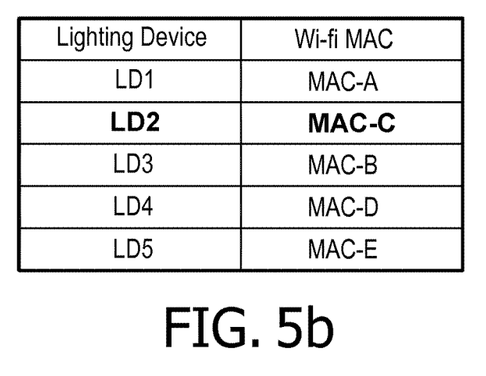

In accordance with the first embodiment, in response to detecting that the lighting device LD2 is to operate as the bridge, the control module 400 is configured to modify the network credential information stored in the memory 402 such that the lighting device LD2 is associated with the Wi-Fi MAC address (MAC-C) used by the lighting device LD3 when the lighting device LD3 was operating as the bridge, and that the lighting device LD3 is associated with the Wi-Fi MAC address (MAC-B) previously associated with the lighting device LD2. The Wi-Fi MAC addresses of the Wi-Fi radio transceiver's 310-1-310-5 following this modification is illustrated in FIG. 5b. Following this modification, the lighting device LD2 is aware that it has become the bridge and is responsible for bridging data between the lighting devices connected to the LR-WPAN 314 and the control device 302 (either directly or via the Wi-Fi access point 304).

The memory 402 may additionally store the Wi-Fi MAC addresses (MAC-A, MAC-D, MAC-E) of lighting devices LD1, LD4 and LD5, however in accordance with the first embodiment, the control module 400 does not modify these additional Wi-Fi MAC addresses.

A second embodiment is now described whereby the memory 402 stores network credential information indicating the Wi-Fi MAC address that is associated with each of the lighting devices in the LR-WPAN 314. That is, the memory 402 stores the lighting device LD2's own Wi-Fi MAC address as well as the Wi-Fi MAC address of each of the other lighting devices (LD1, LD3, LD4, and LD5) in the LR-WPAN 314.

In the second embodiment, the predetermined rules on how to modify the network credential information specify that each of the Wi-Fi MAC addresses of lighting devices (LD1, LD2, LD3, LD4, and LD5) in the LR-WPAN 314 are to be modified. In particular, the Wi-Fi MAC addresses of the lighting devices are to be modified in accordance with a round robin scheme.

In accordance with the second embodiment, in response to detecting that the lighting device LD2 is to operate as the bridge, the control module 400 is configured to modify the network credential information stored in the memory 402 such that the lighting device LD1 is associated with the Wi-Fi MAC address (MAC-B) used by the lighting device LD2 when the lighting device LD3 was operating as the bridge, the lighting device LD2 is associated with the Wi-Fi MAC address (MAC-C) used by the lighting device LD3 when the lighting device LD3 was operating as the bridge, the lighting device LD3 is associated with the Wi-Fi MAC address (MAC-D) used by the lighting device LD4 when the lighting device LD3 was operating as the bridge, the lighting device LD4 is associated with the Wi-Fi MAC address (MAC-E) used by the lighting device LD5 when the lighting device LD3 was operating as the bridge, and the lighting device LD5 is associated with the Wi-Fi MAC address (MAC-A) used by the lighting device LD1 when the lighting device LD3 was operating as the bridge.

Figure 5C:
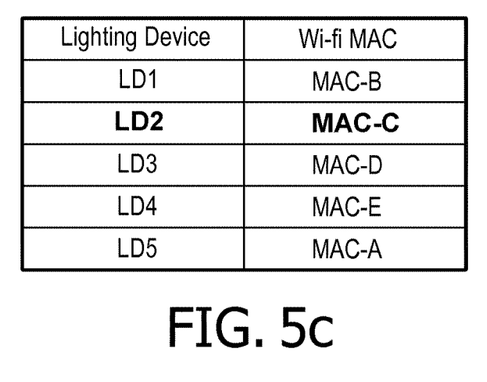

The Wi-Fi MAC addresses of the Wi-Fi radio transceiver's 310-1-310-5 following this modification is illustrated in FIG. 5c. Following this modification, the lighting device LD2 is aware that it has become the bridge and is responsible for bridging data between the lighting devices connected to the LR-WPAN 314 and the control device 302 (either directly or via the Wi-Fi access point 304).

In the above described embodiments, whilst the lighting device LD2 is operating as the bridge, the control module 400 on lighting device LD2 may detect that it should no longer operate as the bridge and actively transfer its role itself. This can be detected in various ways.

The control module 400 on lighting device LD2 may detect that the lighting device LD2 should no longer operate as the bridge based on execution of a bridge election algorithm on the control module 400 (either a distributed arbitration algorithm or a leader election algorithm) i.e. based on signal properties and/or device capabilities associated with lighting device LD2 and the other lighting devices (LD1, LD3, LD4, and LD5) connected to the LR-WPAN 314, and that another lighting device (LD1, LD3, LD4, or LD5) has been elected as the bridge following the election process.

The control module 400 may detect that the lighting device LD2 should no longer operate as the bridge based on one or more measured network QoS parameters of the communication link between the Wi-Fi access point 304 and the Wi-Fi radio transceiver 310-2. For example, the control module 400 may detect that the lighting device LD2 should no longer operate as the bridge in response to detecting that the signal strength (dBm) on the communication link between the Wi-Fi access point 304 and the Wi-Fi radio transceiver 310-2 is less than a predetermined level. In another example, the control module 400 may detect that the lighting device LD2 should no longer operate as the bridge in response to detecting that the amount of traffic on the communication link between the Wi-Fi access point 304 and the Wi-Fi radio transceiver 310-2 is less than a predetermined level during a predetermined period of time. In yet another example, the control module 400 may detect that the lighting device LD2 should no longer operate as the bridge in response to detecting that the latency of the communication link between the Wi-Fi access point 304 and the Wi-Fi radio transceiver 310-2 has exceeded a predetermined level.

The control module 400 may detect that the lighting device LD2 should no longer operate as the bridge based on receiving a command from the control device 302 via the Wi-Fi radio transceiver 310-2 (either directly or via the Wi-Fi access point 304). This command is transmitted from the control device 302 in response to a user of the control device 302 making one or more selections interacting with a software application executed on the control device 302.

The control module 400 may detect that the lighting device LD2 should no longer operate as the bridge based on receiving a command via the Wi-Fi radio transceiver 310-2 from the external server referred to above.

In accordance with the first embodiment, in response to this detection that the lighting device LD2 should no longer operate as the bridge the control module 400 on lighting device LD2 is configured to modify the network credential information stored in the memory 402 accordingly. For example, if the control module 400 detects that the lighting device LD4 has become the bridge, the control module 400 is configured to modify the network credential information stored in the memory 402 such that the lighting device LD4 is associated with the Wi-Fi MAC address (MAC-C) used by the lighting device LD2 when the lighting device LD2 was operating as the bridge, and that the lighting device LD2 is associated with the Wi-Fi MAC address (MAC-D) previously associated with the lighting device LD4. Following this modification, the lighting device LD2 is aware that any communication with the control device 302 is to be via the lighting device LD4.

In accordance with the second embodiment, in response to this detection that the lighting device LD2 should no longer operate as the bridge the control module 400 on lighting device LD2 is configured to modify the network credential information stored in the memory 402 accordingly. For example, if the control module 400 detects that the lighting device LD4 has become the bridge, the control module 400 is configured to modify the network credential information stored in the memory 402 such that the lighting device LD1 is associated with the Wi-Fi MAC address (MAC-E) used by the lighting device LD4 when the lighting device LD2 was operating as the bridge, the lighting device LD2 is associated with the Wi-Fi MAC address (MAC-A) used by the lighting device LD5 when the lighting device LD2 was operating as the bridge, the lighting device LD3 is associated with the Wi-Fi MAC address (MAC-B) used by the lighting device LD1 when the lighting device LD2 was operating as the bridge, the lighting device LD4 is associated with the Wi-Fi MAC address (MAC-C) used by the lighting device LD2 when the lighting device LD2 was operating as the bridge, and the lighting device LD5 is associated with the Wi-Fi MAC address (MAC-D) used by the lighting device LD3 when the lighting device LD2 was operating as the bridge Following this modification, the lighting device LD2 is aware that any communication with the control device 302 is to be via the lighting device LD4.

Whilst the lighting device LD2 is operating as the bridge, the lighting device LD2 may be moved out of its role as bridge by other lighting devices (LD1, LD3, LD4 and LD5) connected to the LR-WPAN 314. For example, if the lighting device LD2 becomes unavailable due to for example the lighting device LD2 losing connection to the Wi-Fi network 316, the lighting device LD2 experiencing interference, the lighting device LD2 moving into a powersave mode, or the lighting device LD2 experiencing a fault, then the remaining lighting devices (LD1, LD3, LD4 and LD5) connected to the LR-WPAN 314 can still perform the election process to elect a new bridge lighting device and act accordingly as described above.

The unavailability of the lighting device LD2 may only be temporary (cause of becoming unavailable was for example loss of connection to the Wi-Fi network 316 or entering a powersave mode) and may re-appear in the LR-WPAN 314.

When the lost bridge lighting device LD2 re-appears, it can gets informed by the other lighting devices (LD1, LD3, LD4 and LD5) directly, or indirectly by listening to the traffic in the LR-WPAN 314, about the change of bridge. If the lighting device LD2 cannot see any other WiFi device, it then naturally concludes that it must have been elected down from the role of bridge device. The lighting device LD2 will not use the Wi-Fi MAC address that it used when operating as the bridge, instead determines which Wi-Fi MAC address to use based on communicating with at least one other lighting device (LD1, LD3, LD4 and LD5) over the LR-WPAN 314.

In both the first and second embodiments described above, the Wi-Fi MAC addresses (MAC-A, MAC-B, MAC-C, MAC-D, and MAC-E) are not directly coupled to a particular lighting device, however each Wi-Fi MAC address remains unique in the LR-WPAN 314.

Whilst the embodiments have been described above with reference to modification of network credential information stored on lighting device LD2. The other lighting devices (LD1, LD3, LD4 and LD5) are also configured to modify network credential information stored on the respective lighting device in the same manner. Each of the lighting devices in the LR-WPAN 314 may synchronize the modification of the network credential information stored in their respective memories. This synchronization may be implemented by communicating scheduling information over the LR-WPAN 314 between the lighting devices (LD1, LD2, LD3, LD4 and LD5). This will advantageously decrease the number of network errors.

The modification of the network credential information performed by the control module 400 when it detects that the role of bridge has changed to another lighting device in the LR-WPAN 314 that has been described above extend to scenarios in which the control device 302 connects to a bridge lighting device in the LR-WPAN 314 via a direct connection in the Wi-Fi network 316 (i.e. not via the Wi-Fi access point 304).

In a third embodiment, following the election of the lighting device LD2 as the bridge instead of lighting device LD3, the lighting device LD3 is configured to continue to be associated with the Wi-Fi MAC address (MAC-C) used by the lighting device LD3 when the lighting device LD3 was operating as the bridge. Furthermore each of the other lighting devices (LD1, LD4 and LD5) are configured to modify the network credential information stored in their respective memories 402 such that each of these lighting devices are associated with the Wi-Fi MAC address (MAC-C) used by the lighting device LD3 when the lighting device LD3 was operating as the bridge.

Thus if the control module 400 on lighting device LD2 detects that the lighting device LD1 is to operate as the bridge instead of the lighting device LD3, in accordance with the third embodiment, the control module 400 is configured to modify the network credential information stored in the memory 402 such that the lighting device LD2 is associated with the Wi-Fi MAC address (MAC-C) used by the lighting device LD3 when the lighting device LD3 was operating as the bridge. Therefore the Wi-Fi radio transceiver 310-2 is configured to use the Wi-Fi MAC address (MAC-C) for communications via the Wi-Fi network 316 when the lighting device LD2 is elected to operate as the bridge.

Figure 5D:
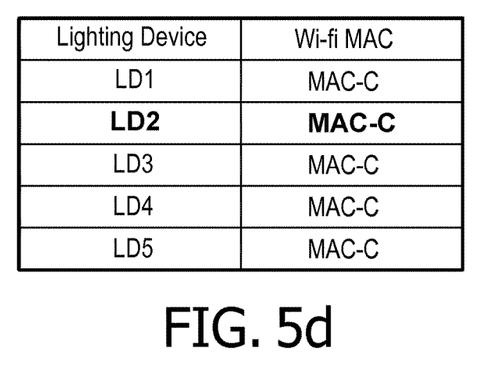

Thus in this embodiment, following this modification of the network credential information stored in their respective memories, all of the lighting devices have the capabilities of operating as the bridge. The Wi-Fi MAC addresses of the Wi-Fi radio transceiver's 310-1-310-5 following this modification is illustrated in FIG. 5d. In lighting systems in which there can only be one lighting device in the LR-WPAN 314 operating as the bridge, this embodiment will work as long as only one lighting device communicates with the Wi-Fi access point 304 at any one time and the remaining lighting devices in the LR-WPAN 314 do not communicate with the Wi-Fi access point 304.

The embodiments described above advantageously enable a seamless network topology change and thus the lighting system 300 maintains operation without incurring a drop in performance.

Whilst the embodiments have been described above with reference to the operation of lighting device LD2, in each embodiment each of the lighting devices are configured to operate in the same manner as that described for lighting device LD2.

In the embodiments described above, when a new lighting device is added to the LR-WPAN 314 the configuration of the lighting system 300 should update. The lighting device operating as the bridge is configured to detect that the new lighting device has been added to the LR-WPAN 314 and determine how the configuration should be updated (e.g. routing information, list of LR-WPAN MAC addresses of lighting devices connected to the LR-WPAN 314, mapping of LR-WPAN MAC addresses to Wi-Fi MAC addresses, possible reassignment of the bridge lighting device). In lighting systems in which there can be only one bridge in the LR-WPAN 314 it is a logical choice that the lighting device operating as the bridge makes this determination.

Should it be permitted to have more than one bridge in the LR-WPAN 314, each of the lighting devices should store predefined information in their respective memories which is used to determine which of the multiple lighting devices operating as a bridge is to determine how the configuration should be updated when it is detected that a new lighting device has been added to the LR-WPAN 314. This predefined information can be stored in the devices and the values stored can be synchronized in advance as well if necessary.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A wireless lighting device comprising:
   a first radio transceiver for connection to at least one other lighting device via a first wireless network;
   a second radio transceiver for connection to a network device via a second wireless network;
   a memory storing network credential information, the stored network credential information indicating a MAC address assigned for use by the second radio transceiver for communication with the network device via the second wireless network; and
   a hardware processor configured to:
   detect that the wireless lighting device is to operate as a bridge between the first and second wireless networks, instead of a further lighting device, of said at least one other lighting device, that has been operating as the bridge between the first and second wireless networks, to allow data to be exchanged between the wireless lighting device and the network device;
   obtain a MAC address associated with the further lighting device that has been established for use by the further lighting device to communicate with the second wireless network; and
   modify the network credential information stored in the memory such that the MAC address associated with the further lighting device is assigned for use by the second radio transceiver for communication with the network device via the second wireless network, thereby configuring the wireless lighting device to operate as the bridge between the first and second wireless networks to allow data to be exchanged between the at least one other lighting device and the network device via the wireless lighting device operating as the bridge.

2. The wireless lighting device according to claim 1, wherein the hardware processor is configured to detect that the wireless lighting device is to operate as the bridge based on reception, via the first radio transceiver, of a message transmitted from the further lighting device via the wireless network, the message instructing the wireless lighting device to operate as the bridge.

3. The wireless lighting device according to claim 2, wherein the hardware processor is configured to obtain the MAC address associated with the further lighting device based on reading said message.

4. The wireless lighting device according to claim 2, wherein the stored network credential information indicates the MAC address associated with the further lighting device, and the hardware processor is configured to obtain the MAC address associated with the further lighting device by querying said memory.

5. The wireless lighting device according to claim 4, wherein the hardware processor is configured to further modify the stored network credential information such that the further lighting device is associated with the MAC address assigned for use by the second radio transceiver for communication with the network device via the second wireless network prior to operating as the bridge.

6. The wireless lighting device according to claim 5, wherein the hardware processor is configured to exchange scheduling information via the first wireless network with the at least one other lighting device to synchronize said modification of the stored network credential information with modification of network credential information stored on the at least one other lighting device.

7. The wireless lighting device according to claim 4, wherein the stored network credential information indicated a MAC address associated with each of the at least one other lighting device for communication via the second wireless network, and the hardware processor is configured to further modify the stored network credential information in accordance with a round-robin scheme.

8. The wireless lighting device according to claim 1, wherein the hardware processor is configured to:
   receive, via the first radio transceiver, signal properties and/or device capabilities associated with said at least one other lighting device transmitted from said at least one other lighting device via the first wireless network;
   determine signal properties and/or device capabilities associated with the wireless lighting device; and
   detect that the wireless lighting device is to operate as the bridge based on a comparison of the signal properties and/or device capabilities associated with the wireless lighting device and the signal properties and/or device capabilities associated with the at least one other lighting device.

9. The wireless lighting device according to claim 1, wherein the at least one other lighting device is a plurality of lighting devices and wherein the hardware processor is further configured to:
   detect that an additional lighting device of the plurality of lighting devices is to operate as the bridge, instead of the wireless lighting device to allow data to be exchanged between the plurality of lighting devices and the network device;
   obtain a MAC address associated with the additional lighting device that has been established for use by the additional lighting device to communicate with the second wireless network; and
   modify the network credential information stored in the memory such that the MAC address associated with the additional lighting device is assigned for use by the second radio transceiver.

10. The wireless lighting device according to claim 1, wherein the hardware processor is configured to detect that the wireless lighting device is to operate as the bridge based on reception, via the first radio transceiver, of a command transmitted from a server connected to a remote network, via the further lighting device.

11. The wireless lighting device according to claim 1, wherein the hardware processor is configured to detect that the wireless lighting device is to operate as the bridge based on reception, via the first radio transceiver, of a command transmitted from a control device connected to the second wireless network, via the further lighting device.

12. A lighting system comprising:
    a first wireless network; and
    a plurality of lighting devices connected to the first wireless network, wherein each given lighting device of the plurality of lighting devices comprises:

a first radio transceiver for connection to at least one other lighting device of the plurality of lighting devices via the first wireless network;
a second radio transceiver for connection to a network device via a second wireless network;
a memory storing network credential information, the stored network credential information indicating a MAC address assigned for use by the second radio transceiver for communication with the network device via the second wireless network; and
a hardware processor configured to:
detect that the given lighting device is to operate as a bridge between the first and second wireless networks, instead of a further lighting device of said plurality of lighting devices that has been operating as the bridge between the first and second wireless networks, to allow data to be exchanged between the given lighting device and the network device;
obtain a MAC address associated with the further lighting device that has been established for use by the further lighting device to communicate with the second wireless network; and
modify the network credential information stored in the memory such that the MAC address associated with the further lighting device is assigned for use by the second radio transceiver for communication with the network device via the second wireless network, thereby configuring the given lighting device to operate as the bridge between the first and second wireless networks to allow data to be exchanged between the plurality of lighting devices and the network device via the given lighting device operating as the bridge.

13. A method implemented by a wireless lighting device comprising a first radio transceiver for connection to at least one other lighting device via a first wireless network; a second radio transceiver for connection to a network device via a second wireless network; and a memory storing network credential information, the stored network credential information indicating a MAC address assigned for use by the second radio transceiver for communication with the network device via the second wireless network; the method comprising:
detecting that the wireless lighting device is to operate as a bridge between the first and second wireless networks, instead of a further lighting device, of said at least one other lighting device, that has been operating as a bridge between the first and second wireless networks, to allow data to be exchanged between the wireless lighting device and the network device;
obtaining a MAC address associated with the further lighting device that has been established for use by the further lighting device to communicate with the second wireless network; and
modifying the network credential information stored in the memory such that the MAC address associated with the further lighting device is assigned for use by the second radio transceiver for communication with the network device via the second wireless network, thereby configuring the wireless lighting device to operate as the bridge between the first and second wireless networks to allow data to be exchanged between the at least one other lighting device and the network device via the wireless lighting device operating as the bridge.

14. A computer program product comprising a non-transitory computer-readable medium configured to store code, the code being configured to, when executed by a hardware processor, cause the hardware processor to perform the method of claim 13.

* * * * *